United States Patent
Rosis

[15] 3,666,735
[45] May 30, 1972

[54] PROCESS FOR IMPROVING PLASTICIZER ABSORPTION OF POLYVINYL HALIDES

[72] Inventor: Constantine Rosis, 35 Yorktown Rd., West Boylston, Mass.

[73] Assignee: Barden, Inc., New York, N.Y.

[22] Filed: Sept. 4, 1968

[21] Appl. No.: 757,486

[52] U.S. Cl. ............260/87.5 R, 260/78.5 CL, 260/85.5 XA, 260/86.3, 260/87.1, 260/92.8 W
[51] Int. Cl. ........................C08f 3/22, C08f 1/11, C08f 1/84
[58] Field of Search....................................260/92.8 W, 87.5

[56] References Cited

UNITED STATES PATENTS

| | | | |
|---|---|---|---|
| 2,279,436 | 4/1942 | Berg | 260/92.8 W |
| 2,559,752 | 7/1951 | Berry | 260/92.8 W |
| 2,875,186 | 2/1959 | Gerhard et al. | 260/92.8 W |
| 2,875,187 | 2/1959 | Gerhard et al. | 260/92.8 W |

FOREIGN PATENTS OR APPLICATIONS 1,115,925  10/1961  Germany...............................260/92.8

OTHER PUBLICATIONS

Moorshead, T. C. Some Thoughts on PVC Plasticisation, In Advances in PVC Compounding and Processing Ed. by Kaufman, M. MacClaren & Sons Ltd. London, 1962 pp. 20, 25

Primary Examiner—Joseph L. Schofer
Assistant Examiner—John A. Donahue, Jr.
Attorney—John L. Sigalos

[57] ABSTRACT

This invention relates to a method for improving the plasticizer absorption qualities of a polyvinyl halide. More particularly, this invention relates to a method as aforesaid wherein a monomeric vinyl halide is polymerized in suspension in the presence of a mineral oil having a boiling point above about 200° C.

6 Claims, No Drawings

PROCESS FOR IMPROVING PLASTICIZER ABSORPTION OF POLYVINYL HALIDES

BACKGROUND OF THE INVENTION

Processes for improving the plasticizer absorption properties of a vinyl halide resin are known. Many of these processes however, encompass additional processing steps after polymerization with the resultant economic disadvantages associated with such additional steps. The present process is an improvement over these prior processes because the improvement in the plasticizer absorption properties of the resin is a result of an inexpensive additive which is incorporated during the polymerization process itself.

SUMMARY OF THE INVENTION

Broadly, this invention contemplates a process for improving the plasticizer absorption properties of a polyvinyl halide resin prepared by suspension polymerization comprising the steps of forming a suspension polymerization reaction mixture comprising a monomeric vinyl halide, a suspending agent, an oil-soluble free radical initiator of polymerization, and a white mineral oil having a boiling point above about 200° C., and heating the reaction mixture at a temperature of from about 30° C. to about 95° C. until polymerization is substantially complete, whereby the plasticizer absorption properties of the resultant polyvinyl halide resin is substantially improved.

DETAILED DESCRIPTION OF THE INVENTION

As to materials, the mineral oil used can be any having a boiling point above about 200° C. and a viscosity between about 5 to about 80 centistokes, or about 45-350 SSU. Preferably, the white mineral oils are used to insure that the resins produced by the process are not discolored by the oil. These are liquid petrolatums of varying viscosities known in the trade as "white oils" because of their generally colorless appearance. They are also highly refined, tasteless, and nearly odorless. Those preferred have a SSU viscosity of from about 70 to about 280. Also utilizable are petrolatum and the paraffin oils. The mineral oil is used in an amount ranging from about 0.1 part to about 2 parts by weight for each 100 parts by weight of monomer and, preferably, from about 0.25 to 1.

The vinyl halide used is preferably vinyl chloride. However, any vinyl halide may be used such as vinyl chloride, vinylidene chloride, vinyl fluoride, vinyl bromide and the like. The invention will be illustrated in connection with the suspension polymerization of vinyl chloride.

If desired, a comonomer may be present in an amount of up to 50 percent based on the weight of the total monomers present. In any event, the vinyl halide monomers present will comprise at least 50 percent by weight of the total monomers present. Suitable comonomers are vinyl acetate; ester of acrylic and methacrylic acids such as methyl, ethyl, butyl, 2-ethylhexyl, propyl, hexyl acrylate and methacrylate; esters of maleic acid such as diethyl, dipropyl, dihexyl, dioctyl; and acrylonitrile; and the like.

The initiator of polymerization may be of the organic peroxide type, the azobisbutyronitrile type, or the peroxypercarbonate type. Examples are diisopropylperoxy dicarbonate, lauroyl peroxide, benzoyl peroxide, di-chlorobenzoyl peroxide, acetyl cyclohexane sulfonyl peroxide, isopropyl peroxypercarbonate, azobisbutyronitrile and the like as well as combinations of catalysts set forth above such as diisopropylperoxide dicarbonate with lauroyl peroxide. The oil-soluble free radical catalyst is included in an amount of from about 0.03 to about 2.0 percent based on the weight of monomer present.

A material such as carboxymethyl cellulose, hydroxypropyl cellulose, hydroxyethyl cellulose, polyvinyl alcohol, gelatin, mixtures thereof, and the like in an amount of from about .05 to about 2.0 percent based on the weight of the monomer present, is included, as a suspending agent.

A surfactant of the anionic or non-ionic type may also be included in the process of this invention. Those which may be used, preferably in an amount of from about 0.005 to about 0.10 percent, based on the weight of monomer present, are alkylaryl sulfates, sulfates of fatty alcohols, sulfates of ethoxylated alcohols, esters of alcohols and glycols, polyoxyethylene alcohols and the like.

The catalysts, suspending agents and surfactants used for vinyl halide suspension polymerization are well-known in the art and the invention is not to be construed as limited to those disclosed for purpose of illustration.

Other ancillary ingredients which may be included in the following amounts, based on the weight of monomer present, are 0.05 – 1.0 percent of a buffer such as sodium bicarbonate and the like, 0.1–2 percent of a chain transfer agent such as carbon tetrachloride, trichloroethylene, toluene and the like.

In carrying out the process of the instant invention a suspension polymerization reaction mixture is formed in the usual manner by admixing the water, vinyl halide monomer (and comonomer if desired), suspending agent, catalyst and mineral oil. It is preferred, however, to first charge the water, mineral oil, and suspending agent into the reaction vessel followed by evacuation of the vessel and subsequent addition of the catalyst and monomer. The reaction is carried out at a temperature of from about 30° to about 95° C. until the polymerization is generally complete. Dependent upon the monomers, temperature, and the like, polymerization is complete in from about about 5 to about 24 hours.

In order to more fully illustrate the nature of this invention and the manner of practicing the same, the following examples are presented.

EXAMPLE 1

Polyvinyl chloride was prepared using the following formula and procedure:

|  | Parts by Weight |
|---|---|
| Vinyl chloride monomer | 100 |
| Isopropyl peroxy percarbonate | 0.025 |
| Mineral oil (b.p. 310°–510° C.) | 0.50 |
| Hydroxy propyl cellulose | 0.05 |
| Water | 200 |

A glass-lined pressure autoclave equipped with external heating and cooling means and an agitator was charged with water, mineral oil and the suspending agent (hydroxypropyl cellulose). The autoclave was then evacuated and the catalyst was charged, followed by the vinyl chloride monomer. The polymerization proceeded smoothly at 122° F. under 150 RPM's and at the end of 10 hours the reaction was complete as the autoclave pressure dropped to 60 psig. and about 90 percent conversion was obtained. The resin was centrifuged and dried.

A control batch was prepared under identical conditions in the absence of mineral oil.

EXAMPLE 2

The polymerization formula and conditions of Example 1 were repeated with the exception that the concentrations of mineral oil was altered as set forth in Table 1 below. Table 1 also includes the test results of the resins made in Example 1.

TABLE I

| Run Numbers | 1 | 2 | 3 | 4 | 5 | 6 |
|---|---|---|---|---|---|---|
|  |  |  | Resin of Ex. 1 |  |  | (Control Resin of Ex. 1) |
| Mineral Oil, % (for 100 parts vinyl chloride monomer) | 0.13 | 0.25 | 0.50 | 0.75 | 1.0 | 0 |
| Brabender* Dry-up-Time | 3'15" | 2'35" | 3'00" | 2'35" | 3'10" | 3'30" |

Vinyl chloride polymerized in the presence of mineral oils, ranging in concentrations from 0.13 to 1.0 percent, had a Brabender dry-up-time that was much faster than that of the control (No. 6) run in the absence of any mineral oil.

*Brabender Procedure

| | |
|---|---|
| PVC Resin | 210.0 gm |
| Basic Carbonate of White Lead | 21.0 gm |
| Clay | 14.7 gm |
| Dioctyl phthalate (DOP) | 109.2 gm |

A sample of resin is mixed with clay and lead carbonate in a Sigma measuring head. After mixing and preheating for 5 minutes at 88° C., the plasticizer (DOP) is added. The wet-lumpy mix changes to a dry, free-flowing powder dry-blend as mixing continues. The Brabender dry-up-time is then determined from the Brabender torque-time charts.

EXAMPLE 3

The polymerization formula and conditions of Example 1 were repeated with the exception that mineral oils of different viscosities were utilized. Table II sets forth the results.

TABLE II

| Run Numbers | 1 | 2 | 3 | 4 | 5 | 6 |
|---|---|---|---|---|---|---|
| Viscosity of Mineral Oil, SSV | 72 | 50 | 215 | 350 | 0 | |
| Percentage charged to reactor | 1.0 | 1.0 | 0.75 | 1.0 | 0 | |
| Brabender* Dry-up-Time | 3'10" | 3'00" | 2'35" | 2'55" | 3'30" | |

EXAMPLE 4

The procedure of Example 1 is repeated except that the catalyst used is varied. The catalyst used are dichlorobenzoyl peroxide, tertiary butyl peroxypivalate, azobisisobutyronitrile, acetyl cyclohexanesulfonyl peroxide.

EXAMPLE 5

The procedure of Example 1 is repeated except that the vinyl chloride monomer there used is replaced, separately and in turn, by equal parts by weight of the following monomer compositions; vinyl chloride - vinyl acetate (60–40), vinyl chloride-methyl acrylate (80–20), vinyl chloride - 2-ethylhexyl methacrylate (55–45), vinyl chloride - diethyl maleate (70–30), and vinyl chloride - acrylonitrile (80–20). In each case dry-up-time is shortened.

While the invention has been illustrated in connection with the polymerization of vinyl chloride it will be clear that the mineral oil functions equally well in the suspension polymerization of the other vinyl halides.

While this invention has been described in terms of certain preferred embodiments and illustrated by means of specific examples the invention is not to be construed as limited except as set forth in the following claims.

What is claimed is:

1. A process for improving the plasticizer absorption properties of a vinyl halide resin prepared by suspension polymerization comprising the steps of forming a suspension polymerization reaction mixture comprising selected from the group consisting of a vinyl halide and a mixture of a vinyl halide and a monomer copolymerizable therewith; a free-radical initiator of polymerization; a suspending agent; water; and a mineral oil having a boiling point above about 200° C., and heating the reaction mixture to effect polymerization, whereby the plasticizer absorption property of the resultant vinyl halide resin is substantially improved.

2. The process according to claim 1 wherein said mineral oil is present in an amount of from about 0.1 part to about 2 parts by weight for each 100 parts by weight of monomer.

3. The process according to claim 2 wherein said monomer is vinyl chloride.

4. The process according to claim 3 wherein said mineral oil is liquid petrolatum having a viscosity of from about 45 to about 350 SSU.

5. The process according to claim 4 wherein the reaction mixture is heated to a temperature between about 30° C. to about 95° C.

6. The process according to claim 1 wherein the monomer consists of at least about 50 percent vinyl chloride and the mineral oil is refined liquid petrolatum having a viscosity of from about 70 to about 280 SSU present in an amount of about 0.25 part to about 1 part by weight for each 100 parts by weight monomer.

* * * * *

UNITED STATES PATENT OFFICE
CERTIFICATE OF CORRECTION

Patent No. 3,666,735         Dated May 30, 1972

Inventor(s) Constantine Rosis

It is certified that error appears in the above-identified patent and that said Letters Patent are hereby corrected as shown below:

On the cover sheet [73] "Barden, Inc." should read -- Borden, Inc. --.

Signed and sealed this 29th day of August 29, 1972.

(SEAL)
Attest:

EDWARD M. FLETCHER, JR.                ROBERT GOTTSCHALK
Attesting Officer                       Commissioner of Patents